(12) United States Patent
Yamashita (10) Patent No.: US 10,882,464 B2
(45) Date of Patent: Jan. 5, 2021

(54) VEHICLE-MOUNTED CAMERA, VEHICLE-MOUNTED CAMERA APPARATUS, AND METHOD OF SUPPORTING VEHICLE-MOUNTED CAMERA

(71) Applicant: SONY SEMICONDUCTOR SOLUTIONS CORPORATION, Kanagawa (JP)

(72) Inventor: Yutaro Yamashita, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/321,219

(22) PCT Filed: May 30, 2017

(86) PCT No.: PCT/JP2017/020098
§ 371 (c)(1),
(2) Date: Jan. 28, 2019

(87) PCT Pub. No.: WO2018/025481
PCT Pub. Date: Feb. 8, 2018

(65) Prior Publication Data
US 2019/0161024 A1 May 30, 2019

(30) Foreign Application Priority Data
Aug. 1, 2016 (JP) .................................. 2016-151365

(51) Int. Cl.
*B60R 11/04* (2006.01)
*G02B 7/02* (2006.01)
(Continued)

(52) U.S. Cl.
CPC ................ *B60R 11/04* (2013.01); *G02B 7/02* (2013.01); *G03B 15/00* (2013.01); *G03B 17/02* (2013.01);
(Continued)

(58) Field of Classification Search
None
See application file for complete search history.

(56) References Cited

U.S. PATENT DOCUMENTS

| 7,426,085 B2 * | 9/2008 | Yoshitsugu | .......... | G02B 15/163 |
| | | | | 359/687 |
| 2004/0165106 A1 * | 8/2004 | Nakagawa | .......... | H04N 5/2252 |
| | | | | 348/373 |

(Continued)

FOREIGN PATENT DOCUMENTS

| EP | 2022676 A2 | 2/2009 |
| JP | 2009-040270 A | 2/2009 |

(Continued)

OTHER PUBLICATIONS

International Search Report and Written Opinion of PCT Application No. PCT/JP2017/020098, dated Aug. 29, 2017, 8 pages of ISRWO.

*Primary Examiner* — James M Hannett
(74) *Attorney, Agent, or Firm* — Chip Law Group (57) ABSTRACT

Provided are an excellent vehicle-mounted camera to be used by being attached to a windshield or the like of a vehicle, a vehicle-mounted camera apparatus, and a method of supporting a vehicle-mounted camera. The vehicle-mounted camera includes a substrate, an image pickup element mounted on the substrate, an image processing circuit that is mounted on the substrate and processes a captured image by the image pickup element, a light collection optical unit that collects incident light, and a reflection unit that reflects output light from the light collection (Continued)

optical unit to the image pickup element. The vehicle-mounted camera further includes a casing that accommodates the substrate on which at least the image pickup element and the image processing circuit are mounted, the light collection optical unit, and the reflection unit.

16 Claims, 8 Drawing Sheets

(51) Int. Cl.
    *G03B 17/56*     (2006.01)
    *G03B 17/02*     (2006.01)
    *H04N 5/225*     (2006.01)
    *G03B 19/07*     (2006.01)
    *G03B 15/00*     (2006.01)
    *B60R 11/00*     (2006.01)
    *G02B 7/182*     (2006.01)

(52) U.S. Cl.
    CPC ............ *G03B 17/56* (2013.01); *G03B 17/561* (2013.01); *G03B 19/07* (2013.01); *H04N 5/225* (2013.01); *H04N 5/2257* (2013.01); *B60R 2011/0026* (2013.01); *B60R 2300/10* (2013.01); *G02B 7/021* (2013.01); *G02B 7/182* (2013.01)

(56) References Cited

U.S. PATENT DOCUMENTS

| | | | |
|---|---|---|---|
| 2005/0036056 A1* | 2/2005 | Ikemachi | G02B 7/28 348/335 |
| 2006/0017834 A1* | 1/2006 | Konno | G02B 13/0025 348/335 |
| 2009/0046149 A1* | 2/2009 | Ohsumi | B60R 11/04 348/148 |
| 2019/0143906 A1* | 5/2019 | Furutake | H04N 5/23238 348/148 |

FOREIGN PATENT DOCUMENTS

| | | |
|---|---|---|
| JP | 2010-028289 A | 2/2010 |
| JP | 4667430 B2 | 4/2011 |
| JP | 2013-246324 A | 12/2013 |

\* cited by examiner

FIG. 8

VEHICLE-MOUNTED CAMERA, VEHICLE-MOUNTED CAMERA APPARATUS, AND METHOD OF SUPPORTING VEHICLE-MOUNTED CAMERA

CROSS REFERENCE TO RELATED APPLICATIONS

This application is a U.S. National Phase of International Patent Application No. PCT/JP2017/020098 filed on May 30, 2017, which claims priority benefit of Japanese Patent Application No. JP 2016-151365 filed in the Japan Patent Office on Aug. 1, 2016. Each of the above-referenced applications is hereby incorporated herein by reference in its entirety.

TECHNICAL FIELD

The present technology disclosed in this description relates to a vehicle-mounted camera used by being attached to a windshield or the like of a vehicle, a vehicle-mounted camera apparatus, and a method of supporting a vehicle-mounted camera.

BACKGROUND ART

Recently, the number of vehicles on which cameras are mounted has been increased (see, for example, Patent Literatures 1 and 2). An image taken by a vehicle-mounted camera can be shown to a driver or another passenger on a monitor screen in a vehicle or can be recorded in a drive recorder, for example. Further, to the image taken by the vehicle-mounted camera, image processing such as image recognition is applied. Thus, it is possible to perform a running assistance or a viewing assistance on the basis of a result of detection of a white line (lane) of a road, a signal, a road sign, an oncoming vehicle, and a pedestrian or the like around an own vehicle.

CITATION LIST

Patent Literature

Patent Literature 1: Japanese Patent Application Laid-open No. 2013-246324
Patent Literature 2: Japanese Patent No. 4667430

DISCLOSURE OF INVENTION

Technical Problem

An object of the present technology disclosed in this description is to provide an excellent vehicle-mounted camera used by being attached to a windshield or the like of a vehicle, a vehicle-mounted camera apparatus, and a method of supporting a vehicle-mounted camera.

Solution to Problem

According to a first aspect of the present technology disclosed in this description, there is provided a vehicle-mounted camera, including:
a substrate;
an image pickup element mounted on the substrate;
an image processing circuit that is mounted on the substrate and processes a captured image by the image pickup element;
a light collection optical unit that collects incident light; and
a reflection unit that reflects output light from the light collection optical unit to the image pickup element.

According to a second aspect of the present technology disclosed in this description, the vehicle-mounted camera according to the first aspect further includes a casing that accommodates the substrate on which at least the image pickup element and the image processing circuit are mounted, the light collection optical unit, and the reflection unit.

According to a third aspect of the present technology disclosed in this description, in the vehicle-mounted camera according to the second aspect, the casing is fixed to an inside of a windshield of a vehicle through a bracket.

According to a fourth aspect of the present technology disclosed in this description, in the vehicle-mounted camera according to the first aspect, the substrate is fixed to an inside of a windshield of a vehicle approximately in a horizontal direction.

According to a fifth aspect of the present technology disclosed in this description, the vehicle-mounted camera according to the first aspect further includes a communication processing circuit that is mounted on the substrate and performs transmission and reception of data.

According to a sixth aspect of the present technology disclosed in this description, the vehicle-mounted camera according to the first aspect further includes a drive circuit of the image pickup element, the drive circuit being mounted on the substrate.

According to a seventh aspect of the present technology disclosed in this description, the vehicle-mounted camera according to first aspect further includes a power supply circuit mounted on the substrate.

According to an eighth aspect of the present technology disclosed in this description, in the vehicle-mounted camera according to the first aspect, a plurality of image pickup elements is mounted on the substrate, the vehicle-mounted camera including: a plurality of light collection optical units respectively corresponding to the plurality of image pickup elements; and a reflection unit that reflects output light from the light collection optical units to the image pickup elements corresponding thereto, respectively.

According to a ninth aspect of the present technology disclosed in this description, in the vehicle-mounted camera according to the eighth aspect, the reflection unit includes a plurality of mirrors respectively corresponding to the plurality of light collection optical units.

According to a ninth aspect of the present technology disclosed in this description, in the vehicle-mounted camera according to the first aspect, the light collection optical unit and the reflection unit are integrally formed.

According to an eleventh aspect of the present technology disclosed in this description, in the vehicle-mounted camera according to the first aspect, the image processing circuit is configured to perform image processing and recognition processing with respect to the captured image by the image pickup element.

According to a twelfth aspect of the present technology disclosed in this description, in the vehicle-mounted camera according to the eleventh aspect, the image processing circuit is configured to perform, as the image processing, at least one of automatic exposure control, an automatic white balance adjustment, or high dynamic range rendering of the image pickup element.

According to a thirteenth aspect of the present technology disclosed in this description, in the vehicle-mounted camera according to the eleventh aspect, the image processing circuit is configured to perform, as the recognition processing, at least one of road lane detection, pedestrian detection, detection of a surrounding vehicle, detection of headlights turned on by an oncoming vehicle, detection of brake lights turned on by a forerunning vehicle, or signal recognition.

According to a fourteenth aspect of the present technology disclosed in this description, in the vehicle-mounted camera according to the eleventh aspect, information relating to a detection result obtained through the recognition processing in the image processing circuit is configured to be output to an outside.

Further, according to a fifteenth aspect of the present technology disclosed in this description, there is provided a vehicle-mounted camera apparatus, including:

an image pickup element mounted on the substrate;
an image processing circuit that is mounted on the substrate and processes a captured image by the image pickup element;
a light collection optical unit that collects incident light;
a reflection unit that reflects output light from the light collection optical unit to the image pickup element;
a casing that accommodates the substrate; and
a bracket that fixes the casing to an inside of a windshield of a vehicle.

According to a sixteenth aspect of the present technology disclosed in this description, in the vehicle-mounted camera apparatus according to the fifteenth aspect, the bracket is configured to support the casing in such a manner that the substrate accommodated in the casing is approximately in a horizontal direction.

Further, according to a seventeenth aspect of the present technology disclosed in this description, there is provided a method of supporting a vehicle-mounted camera, the method including supporting a casing of the vehicle-mounted camera according to the first aspect with a bracket, and fixing the casing to an inside of a windshield of a vehicle.

Advantageous Effects of Invention

According to the present technology disclosed in this description, it is possible to provide the excellent vehicle-mounted camera used by being attached to the windshield or the like of the vehicle, the vehicle-mounted camera apparatus, and the method of supporting a vehicle-mounted camera.

It should be noted that the effects described in this description are merely examples, and the effects of the present technology disclosed in this description are not limited thereto. Further, the present technology disclosed in this description may exert an additional effect in addition to the effects described above in some cases.

Other objects, features, and advantages of the present invention will be apparent from the following detailed description on the basis of embodiments and in conjunction with the accompanying drawings.

MODE(S) FOR CARRYING OUT THE INVENTION

Hereinafter, embodiments of the present technology disclosed in this description will be described in detail with reference to the drawings.

Figure 7:
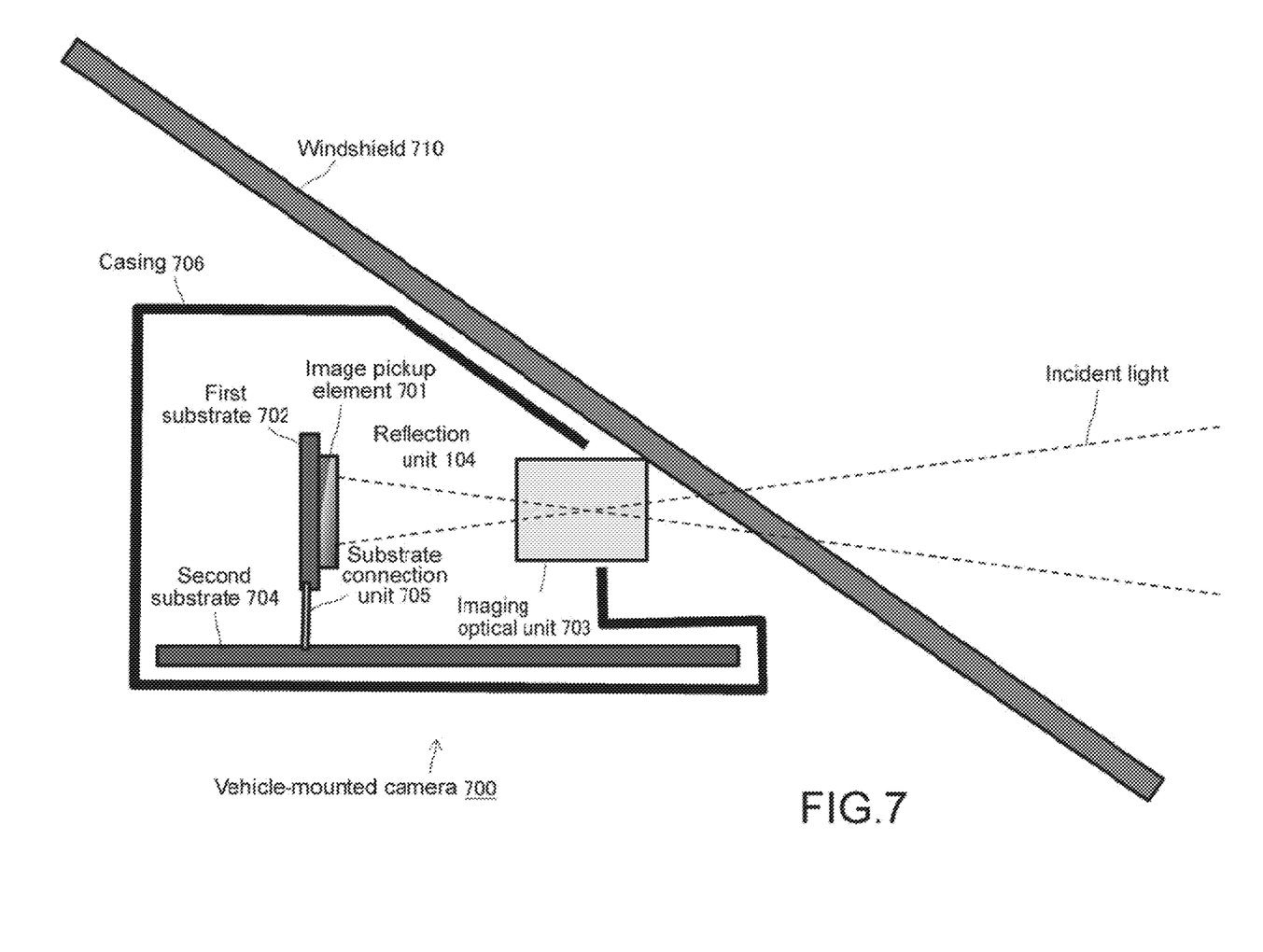
FIG. 7 A diagram showing an inner configuration example of a vehicle-mounted camera 700.

FIG. 7 shows an inner configuration example of a vehicle-mounted camera 700. The figure shows a cross-sectional view of the vehicle-mounted camera 700 in a state of being attached to an inside of a windshield 710 of a vehicle, the diagram being taken along a plane including a horizontal direction (or an optical axis direction of the vehicle-mounted camera 700 or a travelling direction of the vehicle) and a vertical direction.

The vehicle-mounted camera 700 is provided with a first substrate 702 on which an image pickup element 701 such as a CCD (Charge Coupled Device) and a CMOS (Complementary Metal Oxide Semiconductor), an imaging optical unit 703 that performs image forming of light (forward scene) incident on the windshield 710 from ahead of the vehicle (not shown) on an image pickup surface of the image pickup element 701, and a second substrate 704 separated from the first substrate 702. The first substrate 702 and the second substrate 704 are electrically connected through a substrate connection unit 705. The assumption is made that the image pickup element 701 has an optical axis in a perpendicular direction to the first substrate 702.

A casing 706 is a hollow molded product made of plastic, a magnesium alloy, or the like, for example. The casing 706 accommodates the components 701 to 705 described above and is fixed to the inside of the windshield 710 (for example, in the vicinity of a rearview mirror) by a supporting means such as a bracket (not shown in FIG. 7).

Although schematically shown in FIG. 7, the imaging optical unit 703 is constituted of a plurality of optical lenses properly combined and a lens barrel which supports the optical lenses, the plurality of optical lenses being made of glass or plastic.

On the second substrate 704, a drive circuit of the image pickup element 701 and various circuit components for processing pixel signals output from the image pickup element 701 are mounted. Specifically, on the second substrate 704, mounted are the circuit components for performing image correction, image quality securement, and the like with respect to a pickup image by the image pickup element 701, and detecting a white line (lane) of a road, a signal, a road sign, an oncoming vehicle, and a pedestrian in the vicinity of an own vehicle by performing image recognition. On the basis of those detection results, a running assistance and a viewing assistance can be performed. Further, in the case where the vehicle-mounted camera 700 uses a vehicle-mounted network such as CAN (Controller Area Network) communication to perform mutual communication with a control system (not shown) of the vehicle itself, a circuit component for a communication process of this type is also mounted on the second substrate 704. In addition, a power supply circuit of the vehicle-mounted camera 700 is also mounted on the second substrate 704.

Further, the substrate connection unit 705 is constituted of an FPC (Flexible Printed Circuit) and the like, and is connected to each of the substrates 702 and 704 through a B to B (Board to Board) connector or the like.

A forward scene is incident on the windshield 710 approximately in a horizontal direction. To preferably receive an image of the incident light by the imaging optical unit 703, it is necessary to dispose the first substrate 702 on which the image pickup element 701 is mounted approximately in a vertical direction as shown in FIG. 7. In this case, if a drive circuit, an image processing circuit, and a power supply circuit of the image pickup element 701 are mounted on the first substrate 702, an area thereof is inevitably increased. A large area of the first substrate 702 disposed approximately in the vertical direction may hinder a forward viewing field of a driver (not shown). For this reason, in the vehicle-mounted camera 700, the drive circuit, the image processing circuit, a communication processing circuit, and the power supply circuit of the image pickup element 701 are mounted on the second substrate 704 separated from the first substrate 702 to set the area of the first substrate 702 to be small as much as possible, and the second substrate 704 is disposed approximately in the horizontal direction.

However, a configuration in which the first substrate 702 and the second substrate 704 are separated requires connecting the substrates with the substrate connection unit 705 such as the FPC. Therefore, there is concern that manufacture processes may be increased, leading to a reduction in productivity. Further, there is concern that electrical reliability between the substrates may be deteriorated, and the FPC may be a generation source of an EMI (Electro Magnetic Interference).

Figure 8:
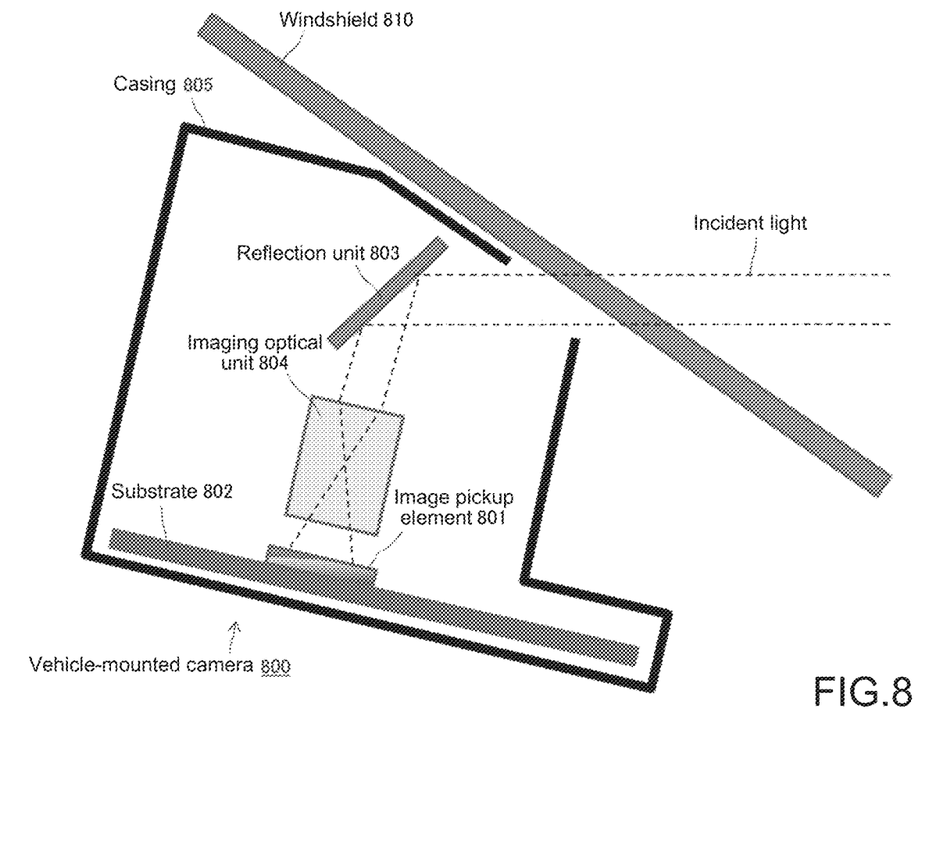
FIG. 8 A diagram showing an inner configuration example of a vehicle-mounted camera 800.

FIG. 8 shows a different inner configuration example of a vehicle-mounted camera 800. The figure is a cross-sectional view of the vehicle-mounted camera 800 in a state of being attached to an inside of a windshield 810 of the vehicle, which is taken along a plane including the horizontal direction (or an optical axis direction of the vehicle-mounted camera 800 or a travelling direction of the vehicle) and the vertical direction.

The vehicle-mounted camera 800 is provided with a substrate 802 on which a circuit component such as an image pickup element 801 is mounted, a reflection unit 803 constituted of an optical mirror and the like, and an imaging optical unit 804. The assumption is made that the image pickup element 801 has an optical axis in a perpendicular direction to the substrate 802. A casing 805 is, for example, a hollow molded product made of plastic, a magnesium alloy, or the like. The casing 805 accommodates the components 801 to 804 described above and is fixed to inside of the windshield 810 (for example, in the vicinity of a rear-view mirror) with a support means such as a bracket (not shown in FIG. 8).

In the example shown in FIG. 8, on the substrate 802, in addition to the image pickup element 801, a drive circuit, an image processing circuit, and a power supply circuit are also mounted (although those are mounted on the second substrate 704 in the example shown in FIG. 7). Further, in the case where the vehicle-mounted camera 800 performs mutual communication with a control system (not shown) of the vehicle itself by using a vehicle-mounted network such as the CAN communication, a circuit component for a communication process of this type is also mounted on the substrate 802. Basically, the assumption is made that the vehicle-mounted camera 800 does not include another substrate separated from the substrate 802.

The reflection unit 803 causes light (that is, forward scene) incident on the windshield 710 from ahead of the vehicle (not shown) to be reflected (or deflected) in a direction of the image pickup element 801.

The imaging optical unit 804 forms an image of the reflection light by the reflection unit 803 on an image pickup surface of the image pickup element 801. Although schematically shown in FIG. 8, imaging optical unit 804 is constituted of a plurality of optical lenses properly combined and a lens barrel which supports the optical lenses, the plurality of optical lenses being made of glass or plastic.

With the configuration example of the vehicle-mounted camera 800 shown in FIG. 8, the incident light (forward scene) that is incident on the windshield 810 approximately in the horizontal direction is reflected (or deflected) on the reflection unit 803. Thus, to preferably receive an image formed by the imaging optical unit 804, the substrate 802 on which the image pickup element 801 is mounted is necessary to be disposed approximately in the perpendicular direction to a reflection direction on the reflection unit 803. However, there is no need to dispose the substrate 802 approximately in the perpendicular direction to the horizontal direction (or incident direction of light on the windshield 810).

In the configuration example of the vehicle-mounted camera 800 shown in FIG. 8, the drive circuit, the image processing circuit, and the power supply circuit are mounted on the same substrate 802 in addition to the image pickup element 801. As a result, the area of the substrate 802 is inevitably increased. However, by causing the incident light on the windshield 810 to be reflected on the reflection unit 803, it is possible to deflect the optical axis direction of the image pickup element 801 in a desired direction. As a result, even when the area of the substrate 802 becomes larger, the substrate 802 is disposed so as to be tilted from the vertical direction, thereby making it possible to prevent a forward viewing field of a driver (not shown) from being hindered as much as possible.

Further, when the increase in the mount area of the substrate 802 is allowed, almost all the circuit components can be mounted on the single substrate 802. Thus, other separated substrates do not have to be provided. Therefore, there is no need to connect substrates by the FPC or the like. It is possible to simplify the manufacturing process and improve the productivity, and remove the FPC as a generation source of an EMI.

However, as shown in FIG. 8, in the configuration in which the incident light on the windshield 810 is reflected (or deflected) first on the reflection unit 803, a viewing angle of the image pickup element 801 is restricted to a viewing angle of the optical mirror that constitutes the reflection unit 803. In order to increase the viewing angle of the image pickup element 801, it is necessary to set the optical mirror to be larger or use the curved mirror such as a convex mirror. The former causes an increase in size of an apparatus, and the latter makes it difficult to manufacture the mirror and assembly the mirror to the apparatus.

Further, the imaging optical unit 804 is constituted of a plurality of optical lenses properly combined and the lens barrel that supports the optical lenses (described above).

When taking a far image, a size of the lenses (lens barrel) is elongated in the optical axis direction. Therefore, there is concern that this causes an increase in height of the vehicle-mounted camera 800 for taking a far image from the substrate 802 to the reflection unit 803, which hinders a viewing field of the driver (not shown). Further, in the case of configuring a multiple vehicle-mounted camera by combining a plurality of image pickup elements for different uses (or focal lengths) e.g., for the purpose of far image taking, middle-distanced image taking, or near wide-angle image taking, respective imaging optical units have different sizes in the optical axis direction. Thus, distances (heights) from the substrate to reflection units are not uniform, which makes assembling troublesome.

Figure 1:
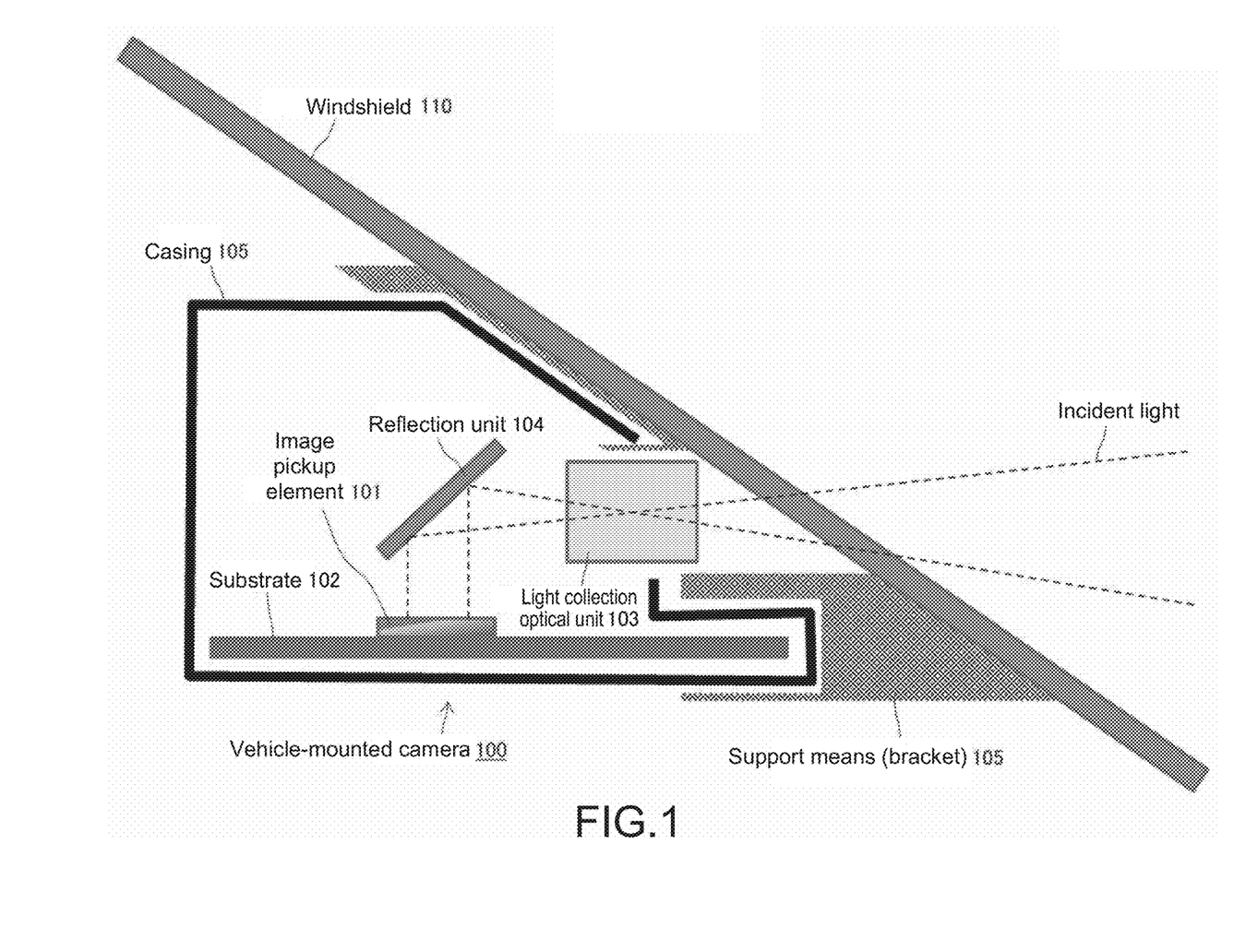
FIG. 1 A diagram showing an inner configuration example of a vehicle-mounted camera 100 to which the present technology disclosed in this description is applied.

FIG. 1 shows an inner configuration example of the vehicle-mounted camera 100 to which the present technology disclosed in this description is applied. The figure shows a cross-sectional view of the vehicle-mounted camera 100 which is attached to an inside of a windshield 110 of the vehicle, which is taken along a plane including the horizontal direction (or an optical axis direction of the vehicle-mounted camera 100 or a travelling direction of the vehicle) and the vertical direction.

The vehicle-mounted camera 100 is provided with a substrate 102 on which circuit components such as an image pickup element (a CCD, a CMOS sensor, or the like) 101 are mounted, a light collection optical unit 103, and a reflection unit 104. The assumption is made that the image pickup element 101 has an optical axis in a perpendicular direction to the substrate 102.

A casing 105 is, for example, a hollow molded product made of plastic, a magnesium alloy, or the like. The casing 105 accommodates the components 101 to 104 and is fixed to the inside (for example, in the vicinity of a rearview mirror) of the windshield 110 with a support means 106 such as a bracket. The support means 106 may be configured integrally with a support means for attaching the rearview mirror to the inside of the windshield 110. With this configuration, it is possible to reduce the number of components as compared to the case where the support means 106 that supports the vehicle-mounted camera 100 and the support means for attaching the windshield 110 are separately provided. Further, in the case where the support means 106 that supports the vehicle-mounted camera 100 and the support means for attaching the windshield 110 are separately provided, it is desirable that the support means 106 be disposed on a side that faces a driver seat relative to the rearview mirror. For example, in the case where a driver seat of the vehicle is on the left side, the support means 106 is disposed on a right side of the rearview mirror. As a result, the vehicle-mounted camera 100 is disposed behind the rearview mirror relative to a position of eyes of a driver. Thus, it is possible to suppress the vehicle-mounted camera 100 from hindering a viewing field of the driver. Further, it is desirable that a position of the optical axis of the vehicle-mounted camera 100 be disposed in an area which is wiped with a wiper. Thus, even in rain, it is possible to take a forward image with the vehicle-mounted camera 100 reliably (that is, in a vivid image).

The substrate 102 is a printed circuit board on which a wiring pattern is formed, or may be a multilayer substrate. On the substrate 102, with the image pickup element 101, the drive circuit, the image processing circuit, and the power supply circuit are mounted. Further, in the case where the vehicle-mounted camera 100 uses the vehicle-mounted network such as the CAN communication to perform mutual communication with a control system (not shown) of the vehicle itself, a circuit component for a communication process of this type is also mounted on the substrate 102. Basically, the assumption is made that the vehicle-mounted camera 100 does not include another substrate separated from the substrate 102. Further, the image pickup element 101 is electrically connected with the drive circuit, the image processing circuit, the power supply circuit, and the like through the wiring pattern formed on the substrate 102. Thus, there is no separated substrate, so a connection means such as an FPC for connecting substrates therewith is unnecessary.

The light collection optical unit 103 collects light (that is, forward scene) incident on the windshield 110 from ahead of the vehicle. Although schematically shown in FIG. 1, the light collection optical unit 103 is constituted of a plurality of optical lenses properly combined and made of glass or plastic and a lens barrel that supports the optical lenses.

The reflection unit 104 causes output light from the light collection optical unit 103 to be reflected (or deflected) toward an image pickup surface of the image pickup element 101 on the substrate 102. The reflection unit 104 is constituted of an optical mirror. Basically, a planar optical mirror can be used therefor, but an optical mirror having a curved surface such as a convex mirror may be used.

According to the configuration example of the vehicle-mounted camera 100 shown in FIG. 1, the incident light (forward scene) which is incident on the windshield 110 approximately in the horizontal direction is collected first by the light collection optical unit 103, and then reflected (or deflected) on the image pickup surface of the image pickup element 101 by the reflection unit 104. That is, exited light from the light collection optical unit 103 is deflected by the reflection unit 104, with the result that the light can be directly formed on the image pickup surface of the image pickup element 101 mounted on the substrate 102. With this configuration, to preferably reflect the output light from the light collection optical unit 103, the reflection unit 104 has to be disposed on an optical axis of the light collection optical unit 103. However, there is no need to dispose the substrate 102 on which the image pickup element 101 is mounted approximately in the perpendicular direction to the horizontal direction (or light incident direction to the windshield 110).

In the configuration example of the vehicle-mounted camera 100 shown in FIG. 1, in addition to the image pickup element 101, the drive circuit, the image processing circuit, and the power supply circuit (not shown) are mounted on the same substrate 102. As a result, the area of the substrate 102 is inevitably increased. However, the incident light to the windshield 110 is collected by the light collection optical unit 103 and then reflected on the reflection unit 104, with the result that the optical axis direction of the image pickup element 101 can be deflected. Therefore, even if the area of the substrate 102 is increased, by disposing the substrate 102 approximately in the horizontal direction, it is possible to prevent the viewing field of the driver (not shown) from being hindered as much as possible.

It is assumed that the "horizontal direction" in this case is approximately the same direction as a direction of eyes of the driver. Further, the "approximately horizontal direction" means that a tilt angle of a flat plane of the substrate 102 with respect to the horizontal direction (or tilt angle of a normal line of the flat plane of the substrate 102 with respect to the vertical direction) is less than a predetermined angle. It should be noted that in the case where the vehicle runs on a tilted road such as a slope, and a body thereof is also tilted, the "horizontal direction" should be interpreted as a "direction parallel to a ground contact surface of the vehicle".

Further, when the increase in the mount area of the substrate 102 is allowed, it is possible to mount approximately all the circuit components necessary to achieve the functions of the camera on the single substrate 102. Thus, another substrate does not have to be provided, so it is unnecessary to connect substrates by an FPC or the like. The manufacturing process is simplified, and the productivity is increased. The FPC as a generation source of an EMI can be removed. On the same substrate 102, the image pickup element 101 and an image processing circuit chip (not shown) are mounted, and wired by a wiring pattern formed on the substrate 102 in the shortest distance, with the result that a stable EMC (Electro Magnetic Compatibility) characteristic can be obtained. In addition, thanks to reducing the number of components such as a substrate and an FPC, a reduction in cost can also be expected.

Further, as shown in FIG. 1, with the configuration in which the incident light on the windshield 110 is collected first by the light collection optical unit 103, a viewing angle of the image pickup element 101 is approximately the same as a viewing angle of the light collection optical unit 103, which does not limit to the viewing angle of the optical mirror that constitutes the reflection unit 104. Thus, it is unnecessary to increase the size of the optical mirror or use a curved mirror such as a convex mirror in order to secure the viewing angle of the image pickup element 101. It is possible to avoid an increase in the apparatus size and a complication of manufacture and assembly operations.

Further, the light collection optical unit 103 is constituted of the plurality of optical lenses properly combined and the lens barrel that supports the optical lenses (described above). Therefore, for each of uses (or in accordance with focal lengths) e.g., for the purpose of far image taking, middle-distanced image taking, or near wide-angle image taking, different sizes in the optical axis direction are caused. However, the configuration subsequent to the reflection unit 103 may be approximately the same. Even if the size of the lens (lens barrel) is elongated in the optical axis direction when capturing a far image, the optical axis direction is approximately parallel to the eye direction of the driver (not shown). Thus, a forward field of view is not hindered very much. Further, even in the case where the multiple vehicle-mounted camera is configured by combining the plurality of image pickup elements for different uses, the light collection optical unit 103 as an end portion of the respective optical systems is only changed. Thus, the assembly operation is prevented from being complicated.

Incidentally, in the case where a high resolution is required like the case in which a far object is detected, it is sufficient that a light collection optical unit having a long focal length and a narrow angle of view (of approximately 25 degrees) is used to pick up an image. Further, in the case where a middle-distanced object is detected, it is sufficient that a light collection optical unit having a shorter focal length than the unit for the far image taking and a wider angle of view (of approximately 50 degrees) is used to pick up an image. Further, in the case where an object is detected in a wide range as much as possible like the case in which a near object is detected, it is sufficient that a light collection optical unit having a short focal length and a wide angle of view (of approximately 150 degrees) is used to pick up an image. Of course, instead of combining the image pickup elements having the different focal lengths, it is also possible to configure a stereo camera by combining image pickup elements arranged so as to make a parallax different with the focal length fixed.

Figure 2:
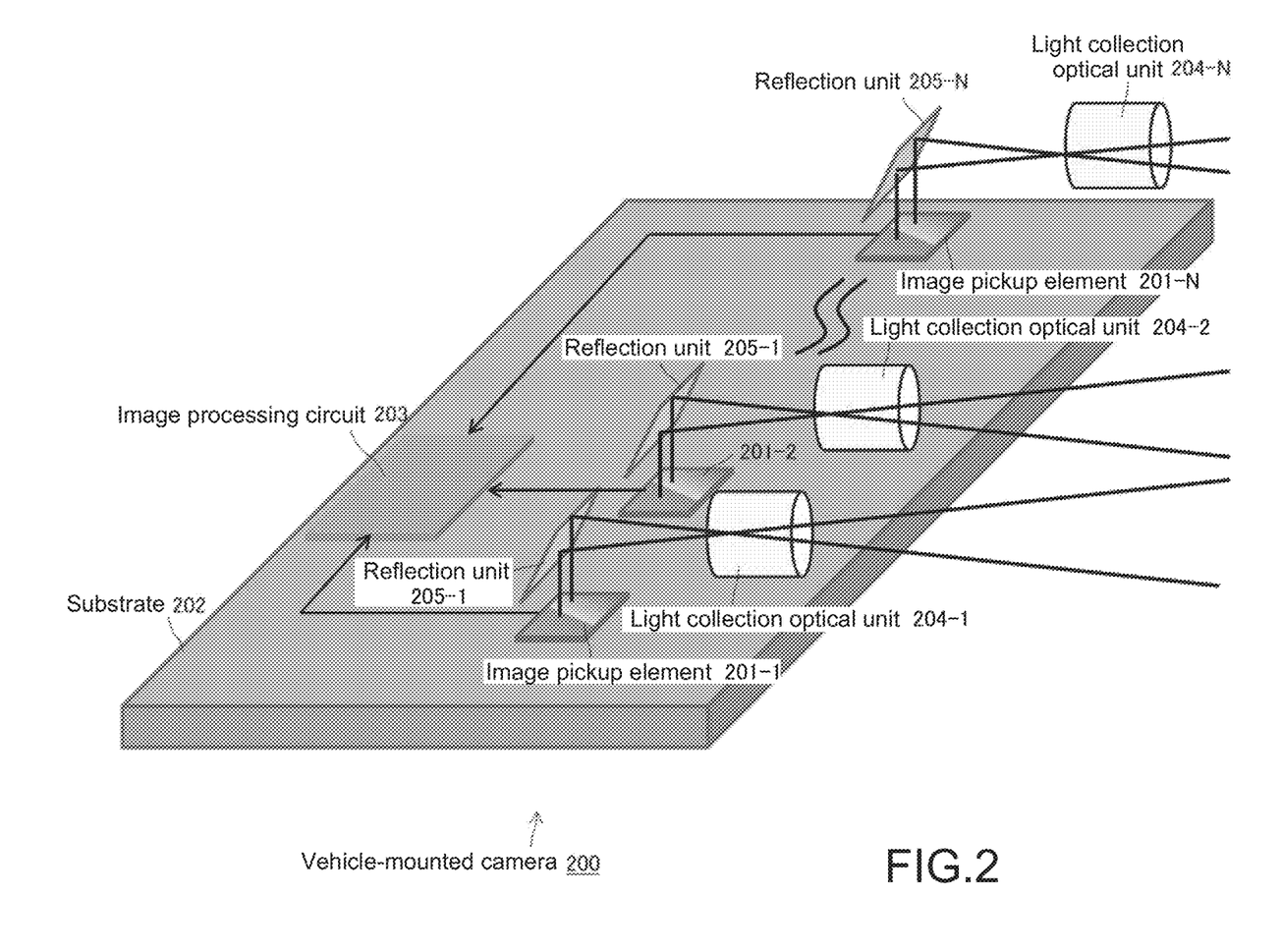
FIG. 2 A diagram showing a configuration example of a multiple vehicle-mounted camera 200 to which the present technology disclosed in this description is applied.

FIG. 2 shows a configuration example of a multiple vehicle-mounted camera 200 to which the present technology disclosed in this description is applied.

Figure 6:
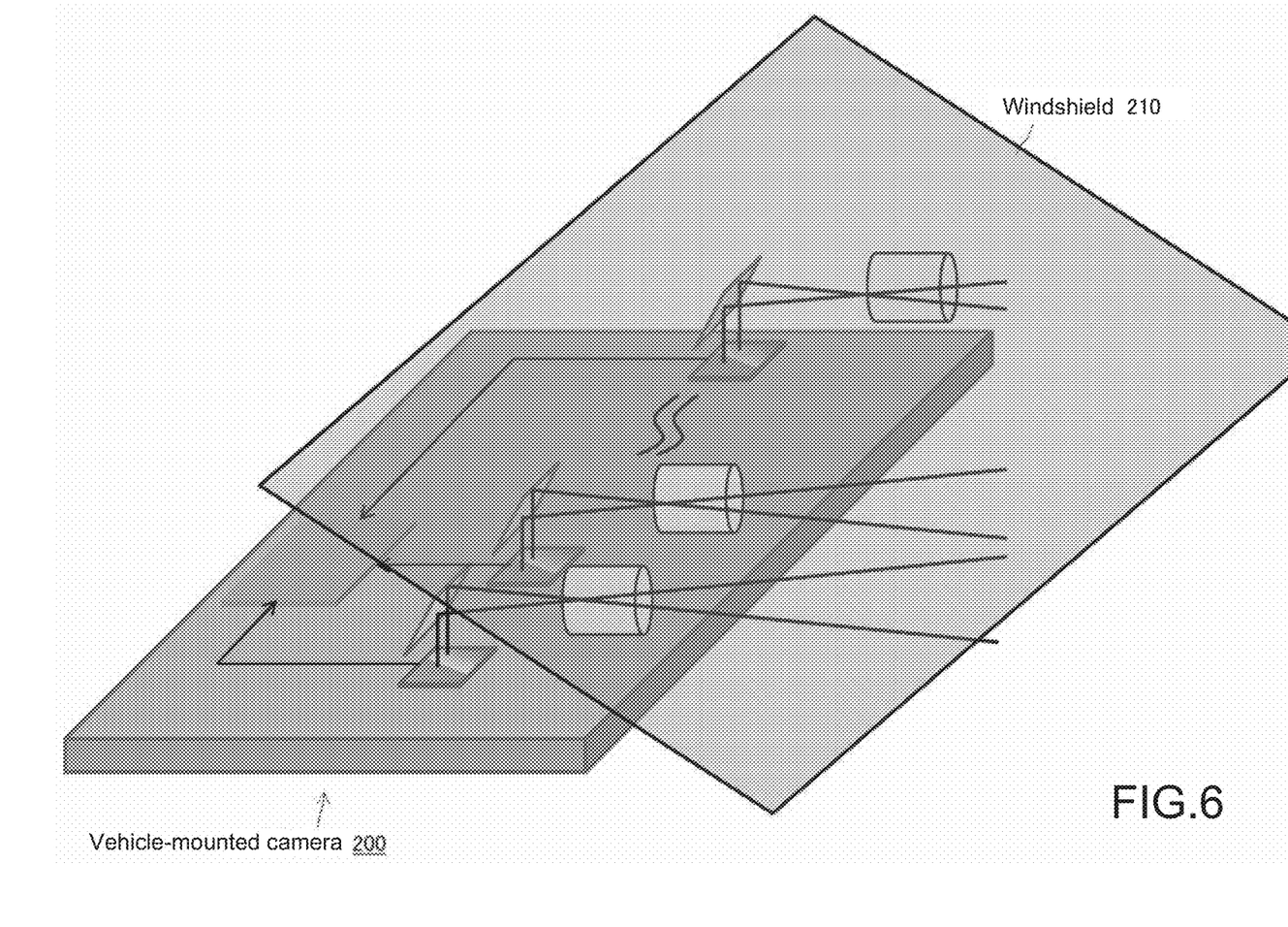
FIG. 6 A diagram showing a state in which the vehicle-mounted camera 200 is fixed inside a windshield.

On a substrate 202, N image pickup elements (such as a CCD and a CMOS sensor) 201-1, 201-2, ..., and 201-N (N: integer equal to or more than 2), an image processing circuit 203 that processes image signals from the image pickup elements 201-1, 201-2, ..., and 201-N, and a drive circuit and a power supply circuit (not shown) of the image pickup elements are mounted. Those components are accommodated in a casing (not shown). In addition, the vehicle-mounted camera 200 is supported by a bracket (not shown) on an inside of a windshield 210 as shown in FIG. 6.

For each of the image pickup elements 201-1, 201-2, ..., and 201-N, light collection optical units 204-1, 204-2, ..., 204-N that collect light (that is, forward scene) incident on the windshield 110, and reflection units 205-1, 205-2, ..., and 205-N that reflect (or deflect) output light from the respective light collection optical units 204-1, 204-2, ..., and 204-N toward image pickup surfaces of the image pickup elements 201-1, 201-2, ..., and 201-N are arranged. In a similar way to the single-lens vehicle-mounted camera 100 shown in FIG. 1, by using the configuration in which the output light from the light collection optical units is deflected by the reflection unit to directly form an image on an image pickup surface, it is possible to achieve the function only with the single substrate 202 even in the vehicle-mounted camera 200 on which the plurality of image pickup elements 201-1, 201-2, ..., and 201-N are mounted. This is desired to be fully understood.

The image pickup elements 201-1, 201-2, ..., and 201-N and the image processing circuit 203 are wired in the shortest distance with a wiring pattern formed on the substrate 202, with the result that stable EMC characteristics can be obtained. In the case of the multiple vehicle-mounted camera using the plurality of image pickup elements, as compared to a product in which image pickup elements are mounted on separated substrates, and the substrates are connected by an FPC, effects of an improvement of the EMC characteristics and an improvement of productivity derived from a reduction in the number of components are extremely great.

The assumption is made that the components 201 ... are accommodated in a casing (not shown) and is fixed on an inside of the windshield (for example, in the vicinity of the rearview mirror) by a support means such as a bracket.

Figure 4:
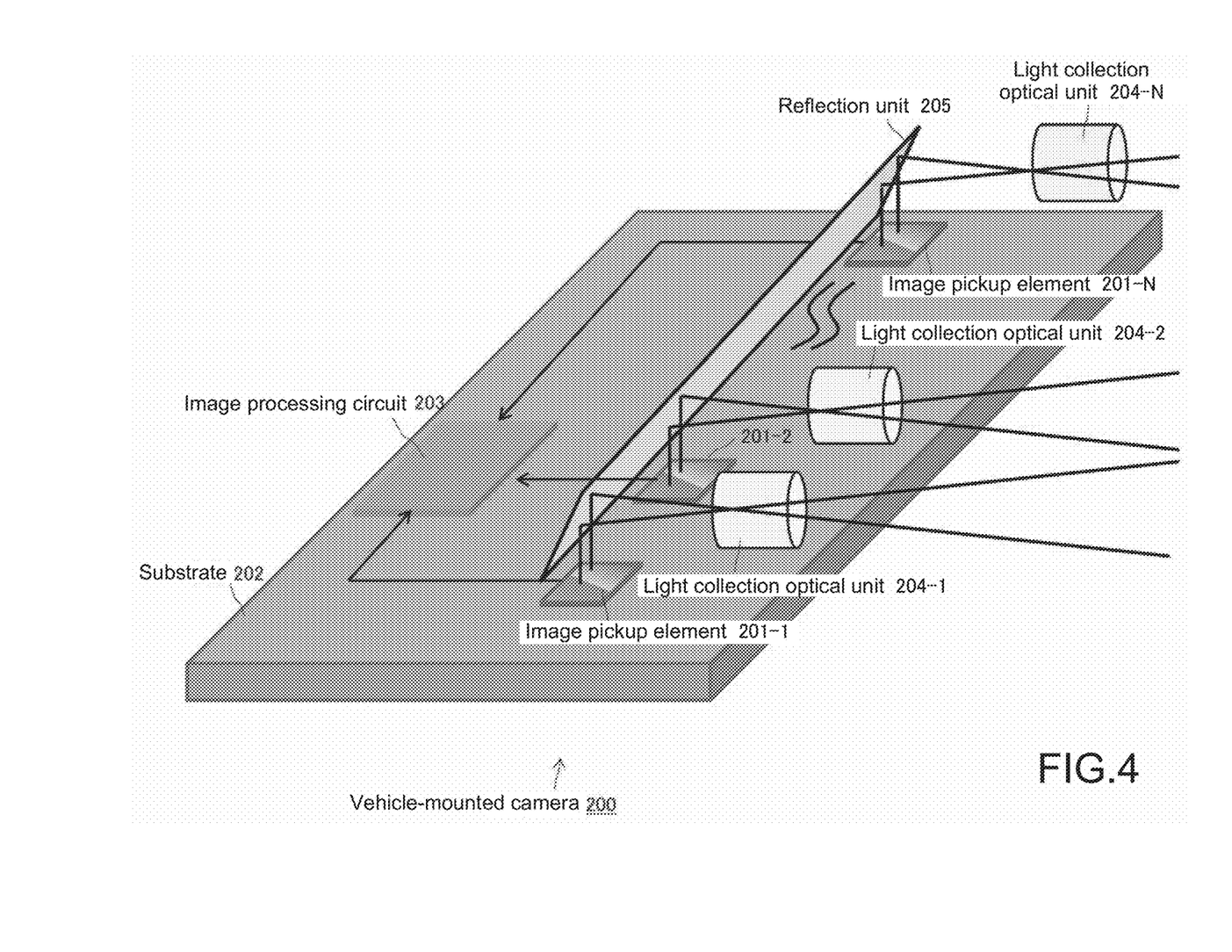
FIG. 4 A diagram showing a modified example of the multiple vehicle-mounted camera 200 shown in FIG. 2.

The light collection optical units 204-1, 204-2, ..., and 204-N are respectively constituted of a plurality of optical lenses properly combined in accordance with respective uses and a lens barrel that supports the optical lenses. Further, the reflection unit 205-1, 205-2, ..., and 205-N are respectively constituted of an optical mirror. Basically, a planar optical mirror can be used. There is a possibility in that a size, a diameter, and the like of the light collection optical units 204-1, 204-2, ..., and 204-N in the optical axis direction may differ depending on uses. In accordance with a distance to a subject desired to be captured by the image pickup elements 201-1, 201-2, ..., and 201-N, the size and the diameter in the optical axis direction are increased. On the other hand, the reflection units 205-1, 205-2, ..., and 205-N have approximately the same configuration. In FIG. 2, the reflection units 205-1, 205-2, ..., and 205-N divided for each of the image pickup elements 201-1, 201-2, ..., and 201-N are used. However, as a modified example, as shown in FIG. 4, one reflection unit 205 integrally formed may be attached onto the substrate 202.

Figure 5:
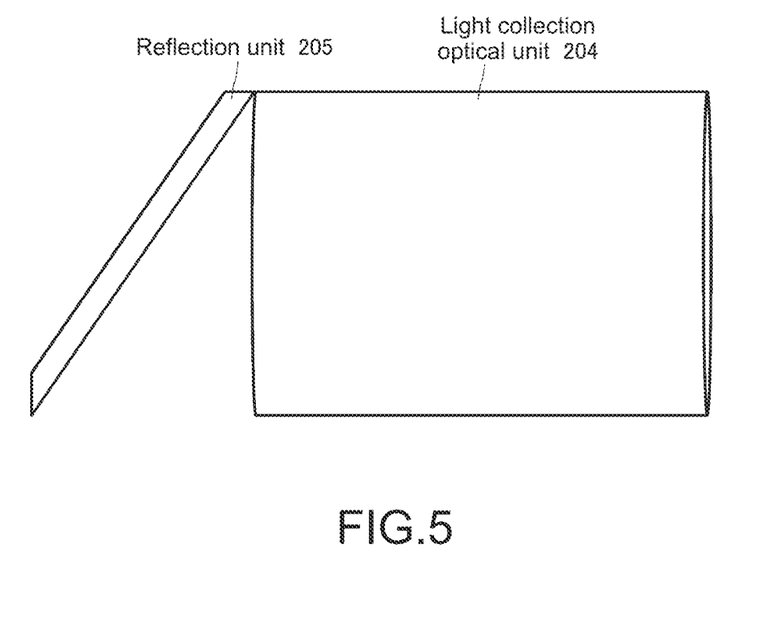
FIG. 5 A diagram showing a configuration example in which a reflection unit is integrally provided in the vicinity of an output terminal to a light collection optical unit.

In FIG. 2, it is considered that the reflection unit 205-1, 205-2, . . . , and 205-N are respectively attached in the vicinity of the image pickup elements 201-1, 201-2, . . . , and 201-N corresponding thereto on the substrate 202. Of course, such a modified example can also be considered that as shown in FIG. 5, not on the substrate 202 side but in the vicinity of output terminals of the corresponding light collection optical units 204-1, 204-2, . . . , and 204-N, the reflection units 205-1, 205-2, . . . , and 205-N are integrally provided.

It should be noted that FIG. 2 shows the example in which the plurality of image pickup elements 201-1 . . . is linearly disposed on the substrate 202. However, such a configuration example of the multiple vehicle-mounted camera can also be considered that the plurality of image pickup elements are disposed in a two-dimensional array manner, or the plurality of image pickup elements are disposed at random.

Figure 3:
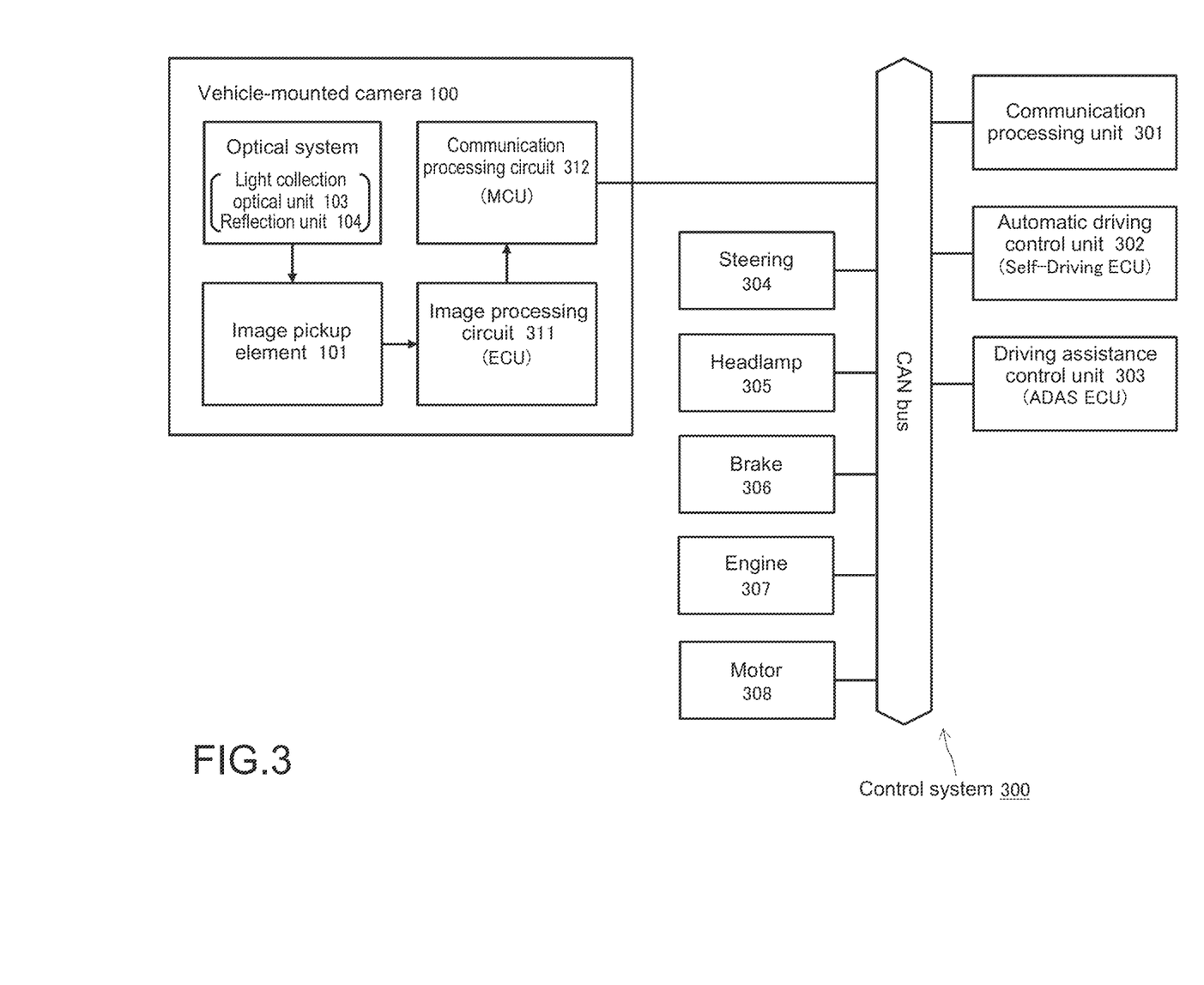
FIG. 3 A functional block diagram of a control system 300 of a vehicle.

FIG. 3 shows an example of a functional block diagram of a control system 300 of the vehicle. The control system 300 shown in the figure includes the vehicle-mounted camera 100 shown in FIG. 1. The assumption is made that the respective units thereof are connected to one another via a CAN bus.

For example, the vehicle-mounted camera 100 is disposed in the vicinity of the rearview mirror on an inside of the windshield of the vehicle, and picks up a forward image of a vehicle travelling direction. It is assumed that the pickup image of the vehicle-mounted camera 100 is basically used for sensing, image processing such as an image recognition is applied to the pickup image, and a white line (lane) of a road, a signal, a road sign, an oncoming vehicle, a pedestrian in the vicinity of an own vehicle, or the like is detected. However, the pickup image of the vehicle-mounted camera 100 may also be used for viewing, and the image may be displayed in the vehicle.

The vehicle-mounted camera 100 is provided with an optical system constituted of the light collection optical unit 103 and the reflection unit 104, the image pickup element 101, an image processing circuit 311, and a communication processing circuit 312.

The light collection optical unit 103 collects incident light on the windshield 110. The reflection unit 104 reflects output light from the light collection optical unit 103 toward the image pickup surface of the image pickup element 101 (described above).

The assumption is made that the reflection unit 104, the image pickup element 101, the image processing circuit 311, and the communication processing circuit 312 are mounted on the same substrate 102 (not shown in FIG. 3). Although not shown in FIG. 3, the assumption is made that the drive circuit of the image pickup element 101 and the power supply circuit for the vehicle-mounted camera 100 are also mounted on the same substrate.

The image pickup element 101 outputs the pickup image (RAW data) to the image processing circuit 311 by serial communication, for example. The image pickup element 101 and the image processing circuit 311 are wired in the shortest distance with a wiring pattern formed on the substrate 102, with the result that stable EMC characteristics can be obtained.

The image processing circuit 311 is constituted of an ECU (Electronic Control Unit), for example. In the case of the vehicle-mounted camera 100 for sensing, in the image processing circuit 311, image processing and recognition processing are performed with respect to the pickup image captured by the image pickup element 101.

Examples of the image processing performed in the image processing circuit 311 include an AE (Automatic Exposure: automatic exposure control), an AWB (Auto White Balance: automatic white balance adjustment), an HDR (High Dynamic Range: high dynamic range rendering), and the like. However, the image processing can also be performed on the side of the image pickup element 101.

Further, as the recognition processing performed in the image processing circuit 311, road white line (lane) detection (Lane Detection), pedestrian detection (Pedestrian Detection), detection of a surrounding vehicle (Vehicle Detection), detection (Headlight Detection) of headlights turned on by an oncoming vehicle, detection (Automatic Emergency Breaking) of brake lights turned on by a fore-running vehicle, signal recognition (Traffic Sign Recognition), and the like are performed.

The communication processing circuit 312 is constituted of an MCU (Micro Control Unit), for example. The communication processing circuit 312 is an interface with the CAN communication in the control system 300, and performs a system conversion between a signal system in the CAN communication and a signal system in the vehicle-mounted camera 100. The detection and recognition results described above by the image processing circuit 311 are transmitted to the control system 300 of the vehicle through the communication processing circuit 312.

A communication processing unit (Communication Unit) 301 on the control system 300 side of the vehicle performs data transmission and reception in a vehicle-to-vehicle communication, a pedestrian-to-vehicle communication, a road-to-vehicle communication, and a communication with the vehicle-mounted camera 100. Further, the communication processing unit 301 communicates with a server (not shown). The assumption is made that various wireless communications can be applied to the communication processing unit 301.

An automatic driving control unit (Self Driving ECU) 302 is an ECU constituted of a CPU (Central Processing Unit), an ISP (Image Signal Processor), a GPU (Graphic Processing Unit), and the like, and manages automatic driving of the vehicle. For example, a result of an image recognition by the GPU for the pickup image taken by the vehicle-mounted camera 100 can be transmitted to the server through the communication processing unit 301, and deep learning by a server such as deep neural network can be executed to receive a learning result.

A driving assistance control unit (ADAS (Advanced Driving Assistance System) ECU) 303 can perform transmission and reception of signals with respective components of the vehicle through the CAN communication. In accordance with the driving operation by the driver, the recognition result for the pickup image taken by the vehicle-mounted camera 100, and the like, the driving assistance control unit 303 generates a control signal for controlling the components of the vehicle and transmits the signal through the CAN communication.

A steering 304, a headlamp 305, a brake 306, an engine 307, and a motor 308 are components of the vehicle, which are control targets by the automatic driving control unit 302 or the driving assistance control unit 303. It is desired to be understood that there are components of the vehicle, which can be the control targets in addition to the components shown in FIG. 3.

For example, when the driving assistance control unit 303 detects that the own vehicle is almost deviated from the white line by the image recognition for the pickup image taken by the vehicle-mounted camera 100, the driving assistance control unit 303 transmits a control signal for driving an EPS (Electronic Power Steering) motor to the steering 304. Further, the driving assistance control unit 303 detects whether or not there are headlights of the oncoming vehicle by the image recognition for the pickup image taken by the vehicle-mounted camera 100, and switches the headlamp 305 between a high beam and a low beam. Alternatively, such a high beam as to avoid the oncoming vehicle is caused to be emitted.

As the recognition process, the image processing circuit 311 in the vehicle-mounted camera 100 may not output image information itself but may output recognized sensing information, that is, only a detection result obtained by the image recognition. Examples of pieces of sensing information are as follows.

Pedestrian Detection for Forward Colligion Warning (FCW): A plurality of times until collision against a forward pedestrian of the own vehicle are output.

Automatic Emergency Breaking (AEB): Turning on brake lights of a forerunning vehicle is detected.

Vehicle Detection for FCW/AEB

Lane Departure Warning (LDW): By edge detection, a lane is detected. In addition to the lane, a shoulder and a curb can also be detected. However, no alert is given during an operation of an indicator.

Traffic Jam Pilot (TJP): Achieved through a marriage with a millimeter-wave radar. For example, in accordance with whether there is a forerunning vehicle or not, a vehicle speed is controlled, a road sign related to a speed limit is recognized to control the vehicle speed, a road sign of an entry or an exit of an expressway is recognized to control the vehicle speed, or the vehicle is automatically decelerated when the own vehicle is approaching a curve.

Lane Keeping Aid (LKA): Executed by TJP.

Vision Only Adaptive Cruise Control (VOACC): Executed by TJP.

Vision Only Traffic Sign Recognition (VOTSR): Executed by TJP. The entry and exit of the expressway is identified by recognizing a road sign (for example, identifying a sign of "limited highway"). In the expressway, a road sign related to the speed limit is recognized to perform automatic control of the vehicle speed.

Intelligent Head Ramp Control (IHC): Whether headlights of an oncoming vehicle are turned on or not is detected, and switching is performed between a high beam and a low beam of the headlamps of the own vehicle. Further, whether tail lamps of the forerunning vehicle are turned on or not is detected, and switching is performed between the high beam and the low beam of the headlamps of the own vehicle. Further, which lane of right and left lanes a light source exists is determined, and such a high beam as to avoid the oncoming vehicle or the forerunning vehicle is caused to be emitted.

INDUSTRIAL APPLICABILITY

In the above, with reference to the specific embodiments, the present technology disclosed in this description is described in detail. However, it is obvious that persons skilled in the art can achieve modification or substitution of the embodiments without departing from the gist of the present technology disclosed in this description.

In this description, the embodiment is mainly described in which the vehicle-mounted camera to which the present technology disclosed in this description is applied is provided on the windshield of the vehicle. However, the gist of the present technology disclosed in this description is not limited to this. To a vehicle-mounted camera which is provided on a portion except the windshield, the present technology disclosed in this description can be applied in a similar way.

Further, the present technology disclosed in this description can be applied not only to the vehicle-mounted camera but also to cameras mounted on various moving body apparatuses such as ships, aircrafts, and moving robots.

In brief, the present technology disclosed in this description is described above in the form of exemplification, but the content described herein should not be limitedly interpreted. To determine the gist of the present technology disclosed in this description, the claims should be taken into consideration.

It should be noted that the present technology disclosed in this description can take the following configurations.

(1) A vehicle-mounted camera, including:
 a substrate;
 an image pickup element mounted on the substrate;
 an image processing circuit that is mounted on the substrate and processes a captured image by the image pickup element;
 a light collection optical unit that collects incident light; and
 a reflection unit that reflects output light from the light collection optical unit to the image pickup element.

(2) The vehicle-mounted camera according to (1) described above, further including:
 a casing that accommodates at least the substrate on which the image pickup element and the image processing circuit are mounted, the light collection optical unit, and the reflection unit.

(3) The vehicle-mounted camera according to (2) described above, in which
 the casing is fixed to an inside of a windshield of a vehicle through a bracket.

(4) The vehicle-mounted camera according to (1) described above, in which
 the substrate is fixed to an inside of a windshield of a vehicle approximately in a horizontal direction.

(5) The vehicle-mounted camera according to (1) described above, further including:
 a communication processing circuit that is mounted on the substrate and performs transmission and reception of data.

(6) The vehicle-mounted camera according to (1) described above, further including:
 a drive circuit of the image pickup element, the drive circuit being mounted on the substrate.

(7) The vehicle-mounted camera according to (1) described above, further including:
 a power supply circuit mounted on the substrate.

(8) The vehicle-mounted camera according to (1) described above, in which
 a plurality of image pickup elements is mounted on the substrate,
 the vehicle-mounted camera including:
 a plurality of light collection optical units respectively corresponding to the plurality of image pickup elements; and
 a reflection unit that reflects output light from the light collection optical units to the image pickup elements corresponding thereto, respectively.

(9) The vehicle-mounted camera according to (8) described above, in which the reflection unit includes a plurality of mirrors respectively corresponding to the plurality of light collection optical units.

(10) The vehicle-mounted camera according to (1) described above, in which
the light collection optical unit and the reflection unit are integrally formed.

(11) The vehicle-mounted camera according to (1) described above, in which
the image processing circuit performs image processing and recognition processing with respect to the captured image by the image pickup element.

(12) The vehicle-mounted camera according to (11) described above, in which
the image processing circuit performs, as the image processing, at least one of automatic exposure control, an automatic white balance adjustment, or high dynamic range rendering of the image pickup element.

(13) The vehicle-mounted camera according to (11) described above, in which
the image processing circuit performs, as the recognition processing, at least one of road lane detection, pedestrian detection, detection of a surrounding vehicle, detection of headlights turned on by an oncoming vehicle, detection of brake lights turned on by a forerunning vehicle, or signal recognition.

(14) The vehicle-mounted camera according to (11) described above, in which
information relating to a detection result obtained through the recognition processing in the image processing circuit is output to an outside.

(15) A vehicle-mounted camera apparatus, including:
an image pickup element mounted on the substrate;
an image processing circuit that is mounted on the substrate and processes a captured image by the image pickup element;
a light collection optical unit that collects incident light;
a reflection unit that reflects output light from the light collection optical unit to the image pickup element;
a casing that accommodates the substrate; and
a bracket that fixes the casing to an inside of a windshield of a vehicle.

(16) The vehicle-mounted camera apparatus according to (15) described above, in which
the bracket supports the casing in such a manner that the substrate accommodated in the casing is approximately in a horizontal direction.

(17) A method of supporting a vehicle-mounted camera, including:
supporting a casing of the vehicle-mounted camera according to (1) described above with a bracket, and fixing the casing to an inside of a windshield of a vehicle.

REFERENCE SIGNS LIST 100 vehicle-mounted camera
101 image pickup element
102 substrate
103 light collection optical unit
104 reflection unit
105 casing
106 support means (bracket)
110 windshield
200 vehicle-mounted camera
201-1, 201-2, . . . , and 201-N image pickup element
202 substrate
203 image processing circuit
204-1, 204-2, . . . , and 204-N light collection optical unit
205-1, 205-2, . . . , and 205-N reflection unit
210 windshield
300 control system
301 communication processing unit
302 automatic driving control unit
303 driving assistance control unit
304 steering
305 headlamp
306 brake
307 engine
308 motor
311 image processing circuit
312 communication processing circuit
700 vehicle-mounted camera
701 image pickup element
702 first substrate
703 imaging optical unit
704 second substrate
705 substrate connection unit
706 casing
800 vehicle-mounted camera
801 image pickup element
802 substrate
803 reflection unit
804 imaging optical unit
805 casing
810 windshield

The invention claimed is:
1. A vehicle-mounted camera, comprising:
a substrate;
a plurality of image pickup elements on the substrate;
a plurality of light collection optical units, wherein
each light collection optical unit of the plurality of light collection optical units is configured to:
receive incident light; and
output the received incident light, and
each light collection optical unit of the plurality of light collection optical units corresponds to a respective image pickup element of the plurality of image pickup elements;
a reflection unit configured to reflect the output light, from the plurality of light collection optical units to the respective image pickup element of the plurality of image pickup elements,
wherein each image pickup element of the plurality of image pickup elements is configured to capture an image based on the reflected light; and
an image processing circuit on the substrate, wherein the image processing circuit is configured to process the captured image.

2. The vehicle-mounted camera according to claim 1, further comprising a casing that accommodates the substrate, the plurality of light collection optical units, and the reflection unit.

3. The vehicle-mounted camera according to claim 2, wherein the casing is fixable to an inside of a windshield of a vehicle by a bracket.

4. The vehicle-mounted camera according to claim 1, wherein the substrate is fixable, to an inside of a windshield of a vehicle, substantially in a horizontal direction with respect to the incident light.

5. The vehicle-mounted camera according to claim 1, further comprising a communication processing circuit on the substrate, wherein the communication processing circuit is configured to control transmission and reception of data.

6. The vehicle-mounted camera according to claim 1, further comprising a drive circuit of the plurality of image pickup elements, wherein the drive circuit is on the substrate.

7. The vehicle-mounted camera according to claim 1, further comprising a power supply circuit on the substrate.

8. The vehicle-mounted camera according to claim 1, wherein
the reflection unit includes a plurality of mirrors, and
each mirror of the plurality of mirrors corresponds to a respective light collection optical unit of the plurality of light collection optical units.

9. The vehicle-mounted camera according to claim 1, wherein the plurality of light collection optical units is integral to the reflection unit.

10. The vehicle-mounted camera according to claim 1, wherein the image processing circuit is further configured to execute a recognition process with respect to the captured image.

11. The vehicle-mounted camera according to claim 10, wherein the image processing circuit is further configured to execute at least one of an automatic exposure control, an automatic white balance adjustment, or a high dynamic range rendering process.

12. The vehicle-mounted camera according to claim 10, wherein the recognition process corresponds to at least one of a road lane detection, a pedestrian detection, a detection of a surrounding vehicle, a detection of headlights turned on by an oncoming vehicle, a detection of brake lights turned on by a forerunning vehicle, or a signal recognition.

13. The vehicle-mounted camera according to claim 10, wherein the image processing circuit is further configured to output information corresponding to a detection result of the recognition process.

14. A vehicle-mounted camera apparatus, comprising:
a substrate;
an image pickup element on the substrate;
a light collection optical unit configured to:
receive incident light; and
output the received incident light;
a reflection unit configured to reflect the output light, from the light collection optical unit, to the image pickup element;
wherein the image pickup element is configured to capture an image based on the reflected light;
an image processing circuit on the substrate, wherein the image processing circuit is configured to process the captured image;
a casing that accommodates the substrate; and
a bracket configured to fix the casing to an inside of a windshield of a vehicle.

15. The vehicle-mounted camera apparatus according to claim 14, wherein the substrate in the casing is substantially in a horizontal direction with respect to the incident light.

16. A method of supporting a vehicle-mounted camera, comprising:
supporting a casing of the vehicle-mounted camera by a bracket; and
fixing, by the bracket, the casing to an inside of a windshield of a vehicle,
wherein the vehicle-mounted camera comprises:
a substrate;
an image pickup element on the substrate;
a light collection optical unit configured to:
receive incident light; and
output the received incident light;
a reflection unit configured to reflect the output light to the image pickup element,
wherein the image pickup element is configured to capture an image based on the reflected light; and
an image processing circuit on the substrate, wherein the image processing circuit is configured to process the captured image.

\* \* \* \* \*